United States Patent [19]

Osborn et al.

[11] 3,975,969
[45] Aug. 24, 1976

[54] TIGHT CHAIN COMPOSITE GEAR DEVICE

[76] Inventors: Merritt A. Osborn, 8706 Cedar Road, Chesterland, Ohio 44026; Osborne C. Dodson, 369 Bentleyville Road, Chagrin Falls, Ohio 44022

[22] Filed: Jan. 14, 1974

[21] Appl. No.: 432,900

[52] U.S. Cl. .................... 74/465; 74/413; 74/243 DR; 74/242.8
[51] Int. Cl.² ................ F16H 55/06; F16H 1/20
[58] Field of Search .......... 74/217 C, 245 R, 253 R, 74/242.8, 242.11 C, 413, 465, 390, 801, 422, 216.5, 219, 222, 229, 448, 243 DR

[56] References Cited
UNITED STATES PATENTS

| | | | |
|---|---|---|---|
| 1,293,123 | 2/1919 | Konetsky | 74/390 |
| 2,938,690 | 5/1960 | Castle | 74/242.8 X |
| 3,108,488 | 10/1963 | Huszar | 74/465 |
| 3,151,495 | 10/1964 | Kurtz | 74/413 |
| 3,205,731 | 9/1965 | Black, Jr. | 74/801 X |
| 3,469,464 | 9/1969 | Peterson et al. | 74/245 R X |
| 3,479,893 | 11/1969 | Appleton | 74/245 R X |
| 3,673,884 | 7/1972 | Southiere | 74/242.11 C X |

*Primary Examiner*—Samuel Scott
*Assistant Examiner*—Lance W. Chandler
*Attorney, Agent, or Firm*—William N. Hogg

[57] ABSTRACT

A composite gear device having a large toothed wheel and a smaller toothed wheel axially offset with respect to each other. A link chain is provided having the same number of tooth engaging openings as the number of teeth on the larger toothed wheel. The chain is secured to the large toothed wheel, preferably by straining it within its elastic limit, so that the chain engages the teeth in an essentially nonflexible configuration free of any articulative movement. The smaller toothed wheel also engages the chain thus allowing the transmission of power in essentially an axial direction.

5 Claims, 9 Drawing Figures

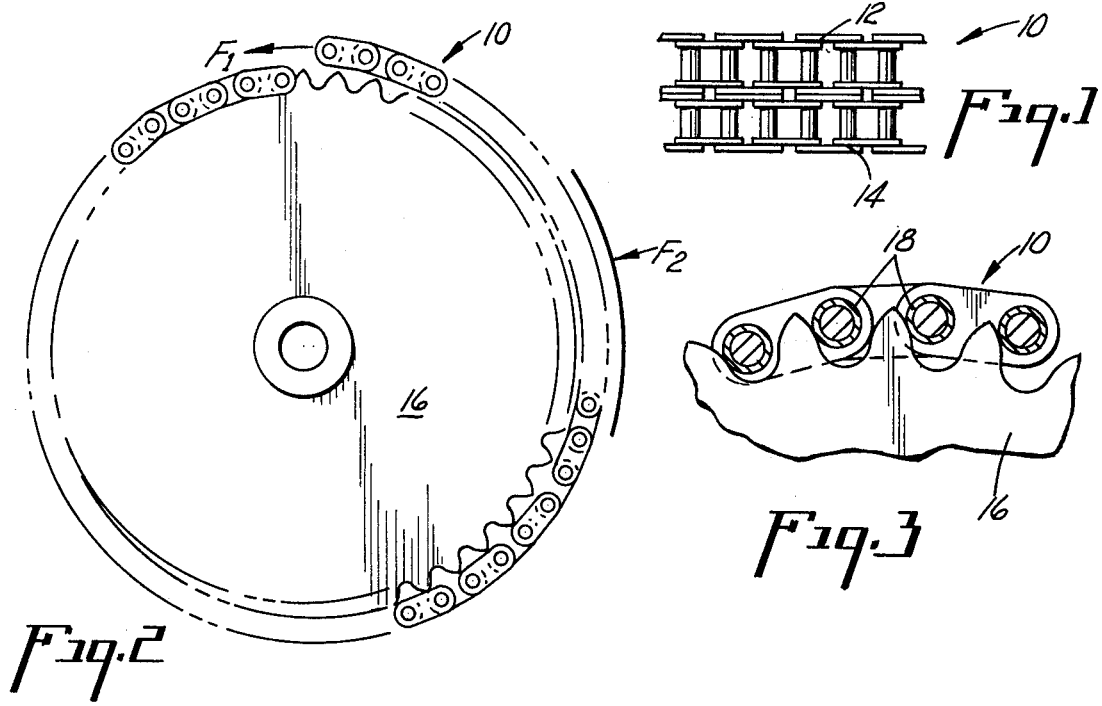
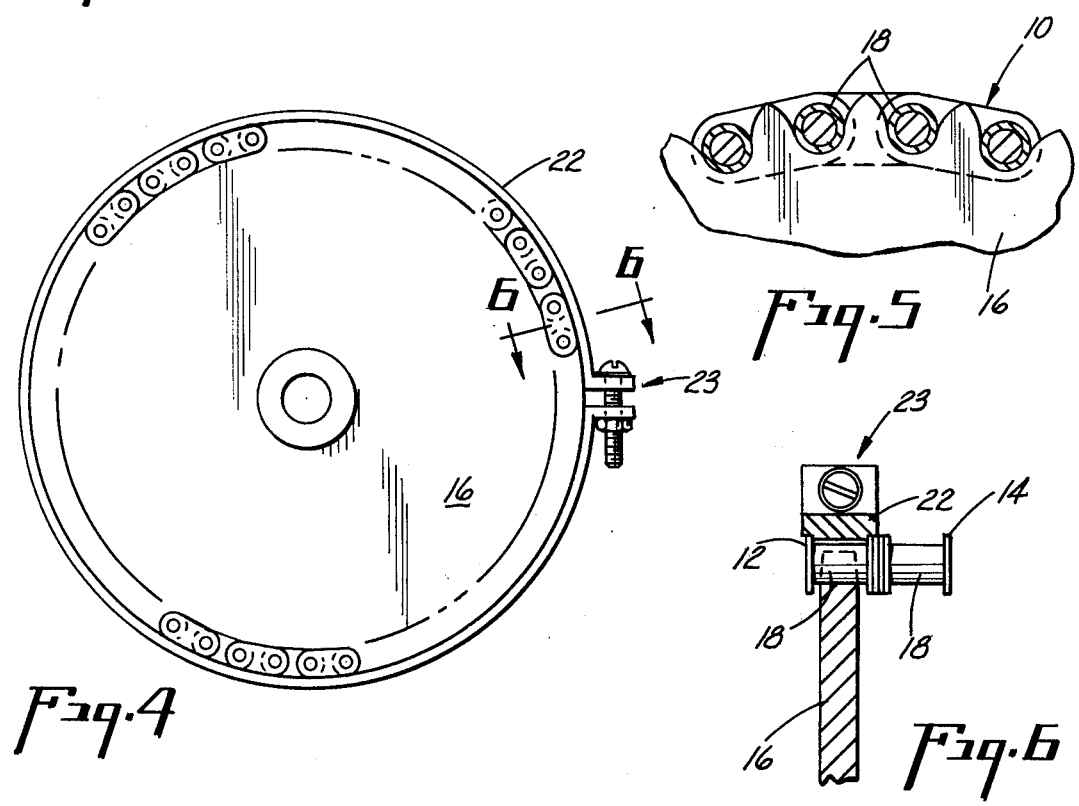

TIGHT CHAIN COMPOSITE GEAR DEVICE

BACKGROUND OF THE INVENTION

1. Field of the Invention

This invention relates generally to drive devices and more particularly to drive devices wherein a flexible chain is utilized in tight engagement with a toothed wheel and drivingly engages a second toothed wheel for transmission of power axially.

2. Description of the Prior Art

There have been many prior art devices provided for the transmission of power, such as conventional meshing gears which have long been utilized for the transmission of power and to achieve increase or decrease in speed. Also, flexible roller type chains have been utilized in many applications for power transmission, the chains being normally interconnected between two different sprocket wheels, thereby transmitting the power between them in a longitudinal direction along the chain, their axes being generally parallel.

There have also been prior devices adapted to provide gearing, or so-called gearing wherein a chain is wrapped around a large toothed wheel and drivingly engages a smaller toothed wheel which is axially spaced from the longer wheel for essentially the transmission of power in an axial direction.

One such prior art proposal has provided a chain having the same number of links as teeth in the larger wheel and wherein the chain is loosely or floatingly engaged on teeth of the large toothed wheel and drivingly engages a smaller toothed wheel.

However, this type of securing of the chain to the larger toothed wheel has resulted in failure of the chain under loads. Devices constructed with this floating chain arrangement find certain advantageous usages, especially under conditions of light loading, and provide an economical solution to certain power transmission applications. However, under heavier loading conditions this floating chain arrangement has exhibited certain serious disadvantages and has not proved entirely satisfactory, this arrangment having a tendency to fail under heavier loads after a relatively short operating life.

After analyzing various failures, it was determined that the loads imposed on the floating chain resulted in a skewing and tilting of the chain. This, in turn, caused a serpentine movement of the chain as the unit revolved. The serpentine motion, together with its causation factors, in turn provides excessive localized stress patterns, thereby resulting in uneven and excessive wear of the teeth of the wheel and pins of the chain, thus causing early failure. Also, with this floating chain arrangement there may be sufficient distortion of the chain to cause it to "jump" the teeth of the wheel.

SUMMARY OF THE PRESENT INVENTION

According to the present invention a toothed wheel and chain gearing device is provided which will transmit heavier loads without early failure due to excessive wear or chain distortion. The device includes an annular chain member with circumferentially spaced gear tooth engaging openings disposed to engage the teeth of at least two axially spaced toothed wheels. A first toothed wheel is provided having regularly spaced teeth engaging each of the gear teeth openings provided for this first wheel means. The second wheel means also has regularly spaced teeth and is axially offset with respect to the first wheel means with the teeth engaging the openings provided for this second toothed wheel. The chain is so applied to the first toothed wheel preferably by stressing it within its elastic limit, that it is essentially non-flexible and free of any articulated movement, at least in the region engaging the first wheel means, to thereby prevent skewing of the band.

DESCRIPTION OF THE DRAWING

FIG. 1 is a plan view of a section of double strand roller type chain suitable for use in one embodiment of the present invention;

FIG. 2 is a front elevational view of the chain of the type shown in FIG. 1 initially wrapped around a toothed wheel and positioned to be secured to the toothed wheel;

FIG. 3 is a detailed view partially in section of a portion of the roller link chain as it is initially applied to the wheel as shown in FIG. 2;

FIG. 4 is a view similar to FIG. 2, showing the chain finally applied to the toothed wheel and positioned for use;

FIG. 5 is a detailed view partially in section of the same section of chain and teeth as shown in FIG. 3 after being finally applied to the toothed wheel;

FIG. 6 is a sectional view taken substantially along a plane designated by the line 6—6 of FIG. 4;

DESCRIPTION OF THE PREFERRED EMBODIMENT

Figure 7:
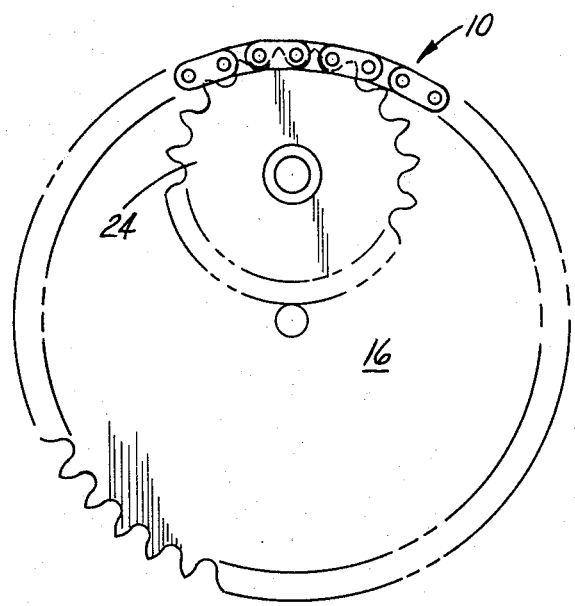
FIG. 7 is a front elevational view of the drive device according to this invention with a chain applied as depicted in FIGS. 2 through 6 in driving engagement with a second toothed wheel.

Referring now to the drawing, a composite gear for the transmission of power axially according to this invention is shown. A flexible band is provided in the form of a roller type chain designated generally as 10 which is formed of two interconnected strands 12 and 14 of conventional roller type links. This chain 10 forms the flexible band which is secured to a toothed wheel 16 to form a "gear" member. In the formation of the chain, the strand 12 of the chain is provided with the same number of links i.e. spaces between rollers 18, as the number of teeth on the toothed wheel 16. However, the length of the chain is slightly less than the length of the pitch line of the teeth of the toothed wheel 16. Thus, in the unstressed, untensioned condition when the chain 10 is wrapped onto the toothed wheel 16, because of its slightly shorter length than the pitch line, the rollers 18 of the strand 12 will engage in the gullets 20 of the teeth for only a portion of the circumference, with the rollers gradually moving out of phase with the gullets so that finally the rollers actually ride up on the tops of the teeth at the opposite end of the chain. This is shown, somewhat diagramatically in FIG. 2. In FIG. 3 the engagement of the rollers and the teeth is shown with the chain loosely applied shown at about 7 o'clock position of FIG. 2.

In order to secure the chain to the toothed wheel 16, force is applied generally as components designated by the arrows F1 and F2 of FIG. 2 which will tend to pull the chain around the circumference of the wheel 16, actually elastically stretching the chain until the rollers 18 drop into the gullets 20 of the teeth all around the entire circumference of the toothed wheel 16. This results in a stressing of the chain. The difference in the length of the chain vis-a-vis the pitch line of the wheel 16 is selected such that when the chain is stressed and finally positioned on the teeth the strain is within the elastic limit of the material of the chain. Hence, the chain is shorter than the circumference of the wheel 16 at the pitch line, but by an amount less than would result in permanent deformation of the chain when stressed and applied to the wheel.

A suitable mechanism for applying the force is shown in FIG. 4 as a clamp member 22 having a screw and nut configuration 23 adapted to apply force when the screw is tightened.

When the chain rollers are securely forced into the gullets of the teeth a final linking of the two ends of the chain can be accomplished. This results in the rollers 18 being firmly forced into the gullets of the teeth all the way around the entire circumference of the toothed wheel 16 causing a positive firm engagement of each and every roller into the tooth gullet.

In FIG. 5 the same 7 o'clock position of the chain is shown after being pre-stressed and applied to the wheel as was shown in FIG. 3 before the pre-stressing. As can be seen in FIG. 5 all of the rollers are firmly forced into the tooth gullets, and this configuration is the same for all of the teeth and rollers around the entire wheel. This positive forcing of the teeth into the gullets results in the strand 12 as applied to the toothed wheel 16 being essentially non-flexible and free of any articulated movement where it engages the toothed wheel 16.

Once the opposite ends of the chain have been linked together in this stressed, strained condition to form a full circle, the clamp member 22 may be removed and the chain will retain this position. However, for some applications, especially where there is likely to be large stresses it may be desirable to leave the clamp member 22 in place, to actually continually apply the radially inwardly directed force to firmly maintain the rollers 18 in the gullets 20 even under high or heavy loading conditions. In fact, this type of arrangement is especially desirable where there is likely to be heavy loads and the tendency toward stretching or stressing and straining of the chain is great. However, under lower load conditions, it may be satisfactory to remove the clamp member and allow the inherent reaction forces of the chain under stress to maintain itself in the tooth gullets. It should be noted, however, that when the band is left in place it should not contact the rollers of the chain, but only the side plates linking the rollers.

Figure 9:
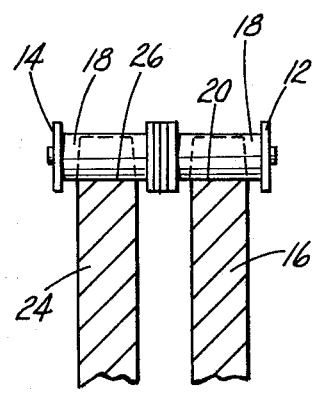
FIG. 9 is a sectional view taken substantially along the plane designated by the line 9—9 of FIG. 8.
Figure 8:
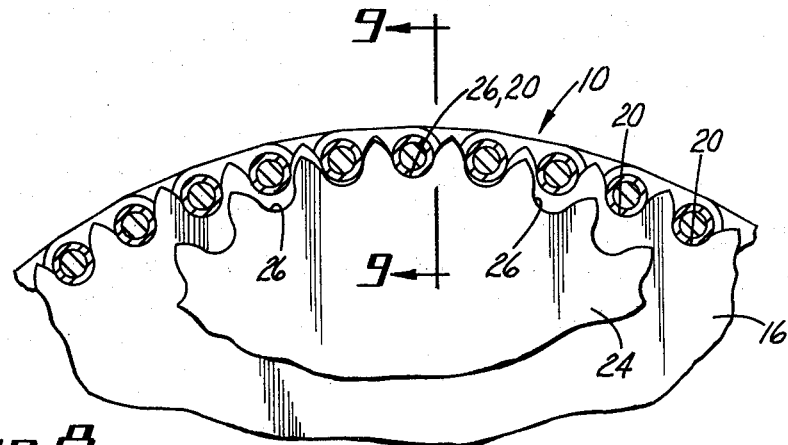
FIG. 8 is a detailed view partially in section of the engaging portion of the teeth of the wheels with the chain.

Referring now to FIGS. 7 through 9, a toothed wheel 16 with a flexible chain 10 mounted thereon and secured thereto as described with respect to FIGS. 2 through 6 is shown, but with the clamp member 22 removed and drivingly engaging with a second toothed wheel 24 having fewer teeth than the wheel 16. The second toothed wheel 24 is axially offset with respect to the toothed wheel 16 and the rollers 18 of the strand 14 are drivingly engaged in a rolling fit in the gullets 26 of the teeth of the second toothed wheel 24. This driving engagement is shown in detail in FIGS. 8 and 9. As can be seen in FIG. 9 particularly, even with this driving engagement of the gullets 26 of the toothed wheel 24 there is essentially no lift of flexure or movement of the rollers 18 of the strand 12, out of engagement with the tooth gullets of the wheel 16 and thus there is no essential flexure or skewing or twisting motion of the rollers 18 with respect to the toothed wheel 16, the chain being held firmly by virtue of its stressed condition. (It is to be understood, of course, that there may well be certain amount of distortion of the chain within the elastic limit of the material, since the material may be slightly stressed within its elastic limit. However, there is no articulated or flexible movement of the chain itself, rather the movement if any is essentially confined to any deformation of the material forming the chain.)

Also, this stressing results in a cage-like structure, severely limiting any skewing or twisting motion even of the unsupported links of the chain strand 14 engaging the wheel 24.

In tests utilizing a roller chain and toothed wheel structure, stressed and applied according to this invention, substantially greater loads were carried for substantially longer service life as compared to a "floating band" arrangement of similar design.

Also, it is to be understood that in high load, high speed operation roller chain should be employed to facilitate engagement and disengagement of links and teeth and minimize wear. However, for low speed intermittant applications, pin-type chains can be employed. Further, under very high load conditions it may be desirable to employ multiple large wheels 16 and/or multiple small wheels 24, such as the so-called "double sprocket" type. For this either wider link chain can be used or additional strands of links supplied.

Thus, according to the present invention there is provided a composite gear structure with a large toothed wheel engaging a band with the band being pre-stressed or in some other manner secured to this large toothed wheel, so that it is essentially non-flexible and free of articulated movement in the region engaged by this large toothed wheel, and the band engages a smaller toothed wheel in a plane axially offset with respect to the large toothed wheel whereby a transmission of power can occur between the two toothed wheels. Further, by virtue of the fact that the band is securely mounted on the large toothed wheel and free of any flexible or articulated movement, large loads can be sustained without deforming the chain.

What is claimed is:

1. A composite gear assembly comprising, an annular link chain member having circumferentially spaced gear tooth engaging openings disposed to engage the teeth of at least two axially spaced toothed wheels, first wheel means having regularly spaced teeth engaging each of said tooth openings for said first wheel means, second wheel means having regularly spaced teeth fewer in number than the first toothed wheel and being axially offset with respect to said first toothed wheel means engaging the openings disposed to be engaged thereby, said chain being essentially nonflexible and free of any articulated movement at least in the region engaging said first wheel means, when engaging said first wheel means (.), said chain is mounted on the first wheel means under tension and strained less than the proportional limit of its material.

2. The invention as defined in claim 1 wherein said band is a roller chain.

3. The invention as defined in claim 1 wherein a clamp member is provided which circumferentially engages said chain around said first wheel means.

4. The invention as defined in claim 1 wherein there are separate strands of the chain for each toothed wheel.

5. The method of forming a composite gear structure comprising the steps of providing first and second toothed wheels, said second wheel having fewer teeth than the first, providing a flexible link chain having a shorter length than the length of the pitch line of the first wheel, stressing the chain to strain it less than the proportional limit of its material and engage all the teeth of the first wheel with all the links of the chain and thereafter securing the chain in this strained position, and engaging the teeth of the second wheel with the chain.

* * * * *